(12) United States Patent
Kuwajima et al.

(10) Patent No.: US 9,076,469 B1
(45) Date of Patent: Jul. 7, 2015

(54) HEAD ASSEMBLY

(71) Applicant: TDK CORPORATION, Tokyo (JP)

(72) Inventors: Hideki Kuwajima, Tokyo (JP); Taku Someya, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 14/619,809

(22) Filed: Feb. 11, 2015

(51) Int. Cl.
*G11B 5/48* (2006.01)

(52) U.S. Cl.
CPC .............. *G11B 5/4826* (2013.01); *G11B 5/48* (2013.01)

(58) Field of Classification Search
CPC .......... G11B 5/48; G11B 5/4833; G11B 5/39; G11B 5/3929; G11B 5/3932
USPC ............................................ 360/245.3–245.9
See application file for complete search history.

(56) References Cited

U.S. PATENT DOCUMENTS

| 8,873,202 | B2* | 10/2014 | Nesori et al. | 360/244.5 |
|---|---|---|---|---|
| 2003/0132683 | A1* | 7/2003 | Yamada et al. | 310/346 |
| 2003/0202292 | A1* | 10/2003 | Arya et al. | 360/294.4 |
| 2003/0223155 | A1* | 12/2003 | Uchiyama | 360/294.4 |
| 2004/0169442 | A1* | 9/2004 | Senoo et al. | 310/328 |
| 2006/0066691 | A1* | 3/2006 | Sakaida et al. | 347/71 |
| 2007/0228876 | A1* | 10/2007 | Sung | 310/320 |
| 2007/0236104 | A1* | 10/2007 | Fujii | 310/358 |
| 2009/0080116 | A1* | 3/2009 | Takahashi et al. | 360/294.4 |
| 2009/0195938 | A1* | 8/2009 | Yao et al. | 360/294.4 |
| 2009/0284871 | A1* | 11/2009 | Yao | 360/294.4 |
| 2009/0316306 | A1* | 12/2009 | Yao et al. | 360/245.3 |
| 2010/0232069 | A1* | 9/2010 | Hata | 360/245.4 |
| 2010/0244054 | A1* | 9/2010 | Ogihara et al. | 257/79 |
| 2011/0211274 | A1* | 9/2011 | Kuwajima | 360/71 |
| 2012/0287536 | A1* | 11/2012 | Kuwajima | 360/234.3 |
| 2013/0200748 | A1* | 8/2013 | Nakamura | 310/311 |
| 2013/0250007 | A1* | 9/2013 | Ishimori et al. | 347/70 |
| 2014/0091678 | A1* | 4/2014 | Koizumi et al. | 310/367 |
| 2014/0339961 | A1* | 11/2014 | Maejima et al. | 310/358 |
| 2014/0339962 | A1* | 11/2014 | Furukawa et al. | 310/363 |
| 2015/0064804 | A1* | 3/2015 | Horikiri et al. | 438/3 |

FOREIGN PATENT DOCUMENTS

JP  2011138596 A  7/2011
JP  2012238350 A  12/2012

* cited by examiner

*Primary Examiner* — Allen T Cao
(74) *Attorney, Agent, or Firm* — Oliff PLC

(57) ABSTRACT

A head assembly includes: a first link that is disposed to interconnect between a first joint connected to a slider support plate and a second joint connected to a first fixing unit; a second link that is disposed to interconnect between a third joint connected to the slider support plate and a fourth joint connected to a second fixing unit; a first drive unit that drives the first link; and a second drive unit that drives the second link.

16 Claims, 15 Drawing Sheets

FIG. 11
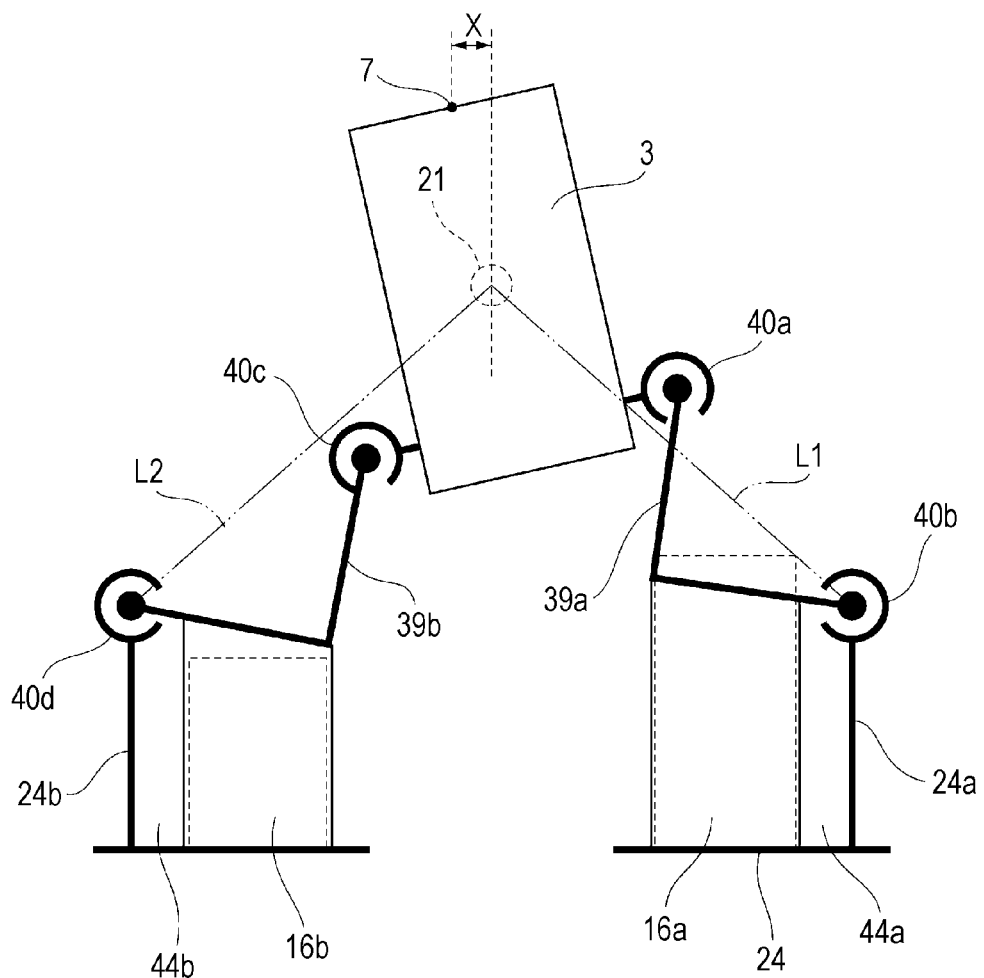
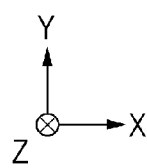

FIG. 13
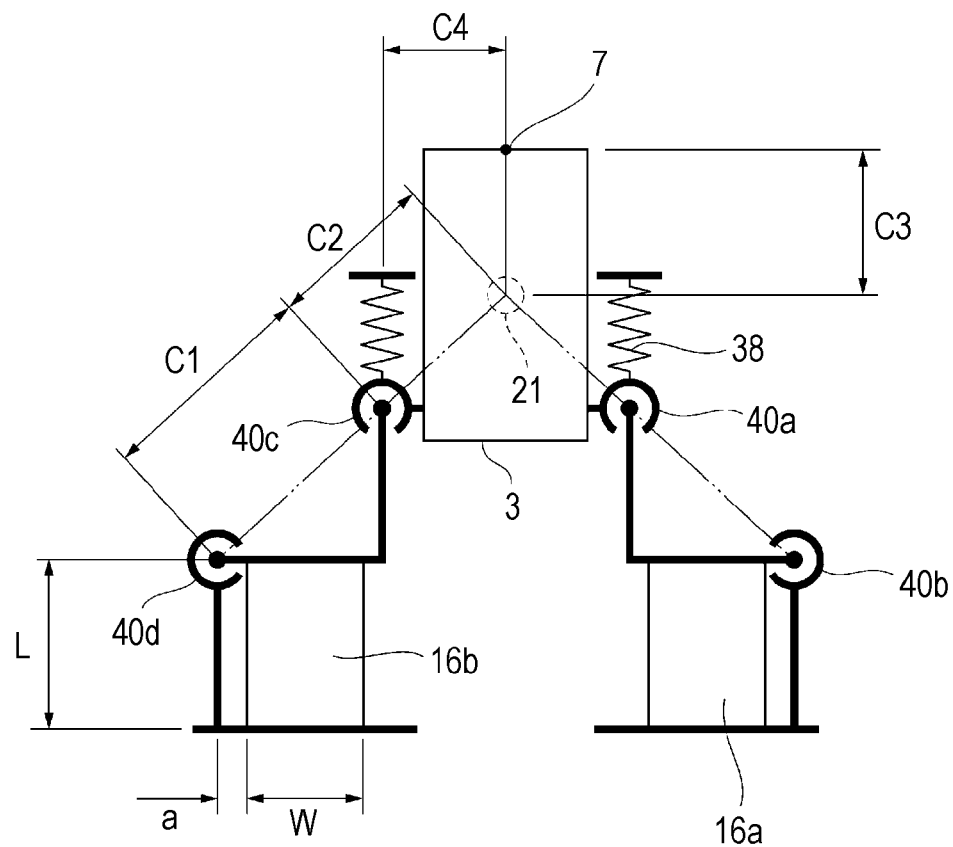
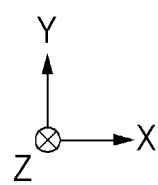

HEAD ASSEMBLY

BACKGROUND OF THE INVENTION

1. Field of the Invention

The present invention relates to a head assembly that is equipped with a head rotation mechanism such as a micro-actuator in order to achieve high density recording on a magnetic disk drive which is used, for example, as a storage device of a computer.

2. Description of the Related Art

In recent years, high density recording on magnetic disk drives has been advanced. Each magnetic disk drive is provided with a slider that includes a magnetic head for recording and reproducing data on or from the magnetic disk, and the slider is supported by a head support mechanism. The head support mechanism is mounted on a head actuator arm which is rotatably driven by a voice coil motor (VCM). The VCM controls the magnetic head mounted on the slider to be positioned at any point on the magnetic disk. However, in order to achieve further higher density recording on a magnetic disk, it is desirable that accuracy in positioning of the magnetic head on the magnetic disk be further increased. However, accuracy in positioning the magnetic head may not be improved by simply driving the VCM to rotate the head actuator arm and to position the magnetic head.

Japanese Unexamined Patent Application Publication (JP-A) No. 2011-138596 discloses the entire configuration of a head assembly that is equipped with a conventional head rotation mechanism. A flexure at the tip end of the head assembly includes a thin film piezoelectric element, and application of a voltage to the thin film piezoelectric element causes the thin film piezoelectric element to contract, thereby the slider rotates around a support projection and the magnetic head is finely displaced and accurately controlled to be at a position on a track. At this point, head element wiring disposed around the outer perimeter of the thin film piezoelectric element expands and contracts along with a displacement of the thin film piezoelectric element.

A thin film piezoelectric element is formed on a wafer by sputtering, and the number of elements available from a single wafer determines the cost. Thus it is a great challenge to maximize the number of elements that are available from a single process of film formation. Therefore, more efficient drive method is demanded in order to achieve a predetermined displacement with a smaller element.

SUMMARY OF THE INVENTION

The present invention has been made in view of the above-described situation and provides a head assembly that is capable of achieving efficient drive in order to obtain a desired head element displacement without increasing the size of a thin film piezoelectric element.

An aspect of the present invention provides a head assembly in which a slider including a head element is supported on a slider support plate which is formed in a flexure and rotatable around a support projection which is provided at a tip end of a load beam, the head assembly including: a first link that is disposed to interconnect between a first joint connected to the slider support plate and a second joint connected to a first fixing portion; a second link that is disposed to interconnect between a third joint connected to the slider support plate and a fourth joint connected to a second fixing portion; a first drive unit that drives the first link; and a second drive unit that drives the second link.

With this configuration, when the slider produces reciprocating rotational motion around the support projection, a drive load applied to the thin film piezoelectric element may be reduced and the head displacement may be amplified.

A configuration may be adopted in which the support projection coincides with an intersection point of lines extended from a first line segment and a second line segment, the first line segment connecting the first joint and the second joint, the second line segment connecting the third joint and the fourth joint. With this configuration, a drive load applied to the thin film piezoelectric element may be further reduced.

The first and second links may each include a wiring section that transmits a signal to the head element, and a reinforcing plate that partially reinforces the wiring section. The reinforcing plate is obtained by etching a stainless substrate included in the flexure. Consequently, a reinforcing plate may be easily provided without adding a new machining process, and stable positioning of the head may be achieved.

A configuration may be adopted in which a first separation groove is provided between the first drive unit and the second joint, and a second separation groove is provided between the second drive unit and the fourth joint. With this configuration, degree of deformation of the drive unit may be increased.

The length-to-width ratio L/W of the area of each of the first and second drive units may be 2 or greater. With this configuration, the balance between the displacement and the rotational stiffness of the slider may be set in an optimal state.

BRIEF DESCRIPTION OF THE DRAWINGS

FIG. 11 is a model diagram illustrating the manner of rotational motion of the slider in the head assembly according to the preferred embodiment of the present invention;

FIG. 13 is a model diagram of a rotation mechanism of a slider in an example;

DESCRIPTION OF THE PREFERRED EMBODIMENTS

Hereinafter, a preferred embodiment of the present invention will be described with reference to the drawings. It is to be noted that the present invention is not limited to the embodiment below. The components described below include some components that readily occur to those skilled in the art or are essentially the same. In addition, the components described below may be combined as appropriate. Also, omission, replacement, and modification of the components may be made in various manners without departing from the spirit of the present invention.

Figure 1:
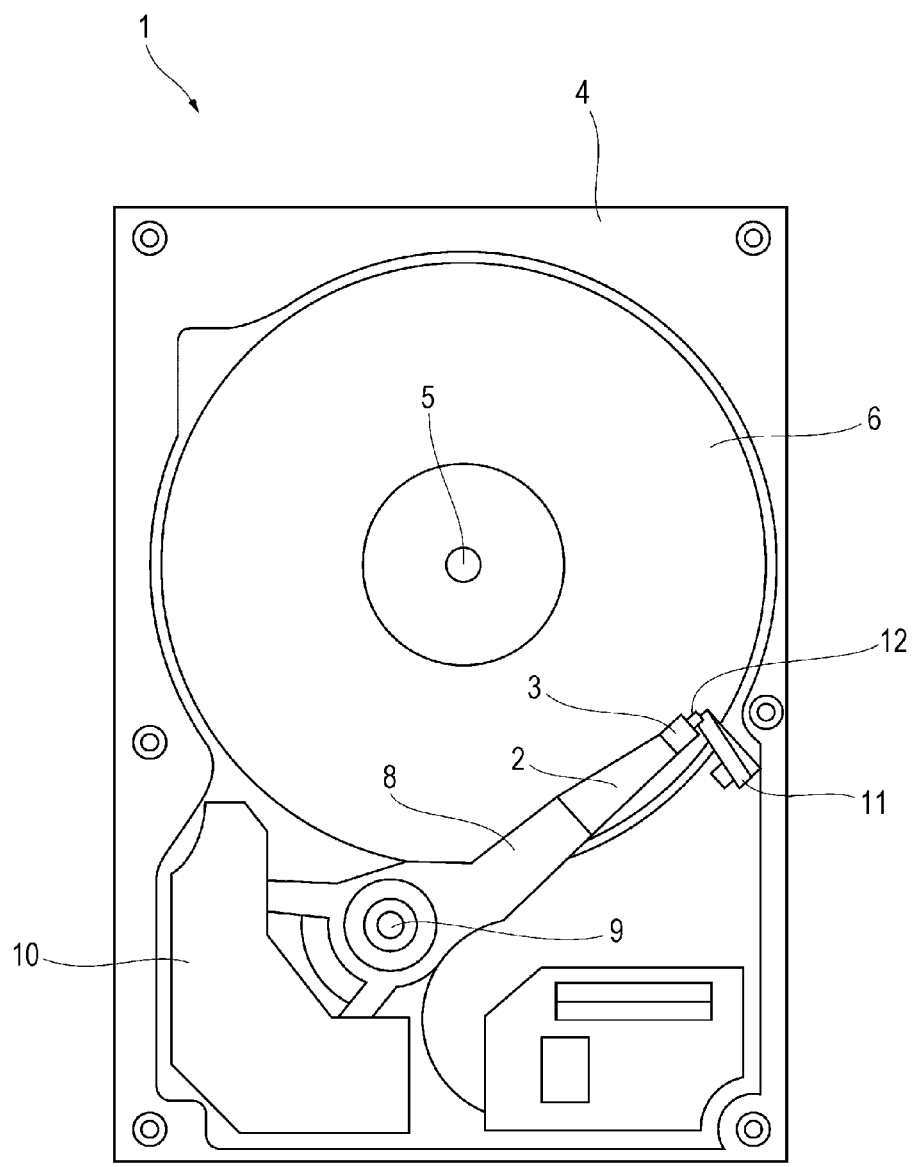
FIG. 1 is a schematic plan view of a magnetic disk drive on which a head assembly according to a preferred embodiment of the present invention is mounted.

FIG. 1 schematically illustrates the entire configuration of a load/unload type magnetic disk drive (HDD device) 1 on which the head assembly according to the preferred embodiment of the present invention is mounted. As seen from FIG. 1, the magnetic disk drive 1 includes a housing 4, a magnetic disk 6 that is rotationally driven around a shaft 5 by a spindle motor, a head assembly 2 having a tip end to which a slider 3 having a head element 7 is attached, and a support arm 8 that supports the head assembly 2 at the tip end.

The rear end of the support arm 8 is equipped with a coil section of a voice coil motor (VCM), and the support arm 8 is rotatable around a horizontal rotation shaft 9 parallel to the surface of the magnetic disk 6. The VCM includes the coil section (not illustrated) and a magnet section 10 that covers the coil section. A ramp mechanism 11 is provided between an outward position of the data area of the magnetic disk 6 and an outward position of the magnetic disk 6. When a tab 12 provided at the tip end of the head assembly 2 is lifted up the inclined surface of the ramp mechanism 11, the slider 3 is caused to be separated from the magnetic disk 6, and thus the slider 3 is set in an unload state.

When the magnetic disk drive 1 is in operation (during high speed rotation of the magnetic disk), the slider 3 faces the surface of the magnetic disk 6 and floats at a low height, and so is in a load state. On the other hand, when the magnetic disk drive 1 is not in operation (when the magnetic disk is at rest or during low speed rotation of the magnetic disk at start or stop), the tab 12 at the tip end of the head assembly 2 is on the ramp mechanism 11, and so the slider 3 is in an unload state.

Figure 2:
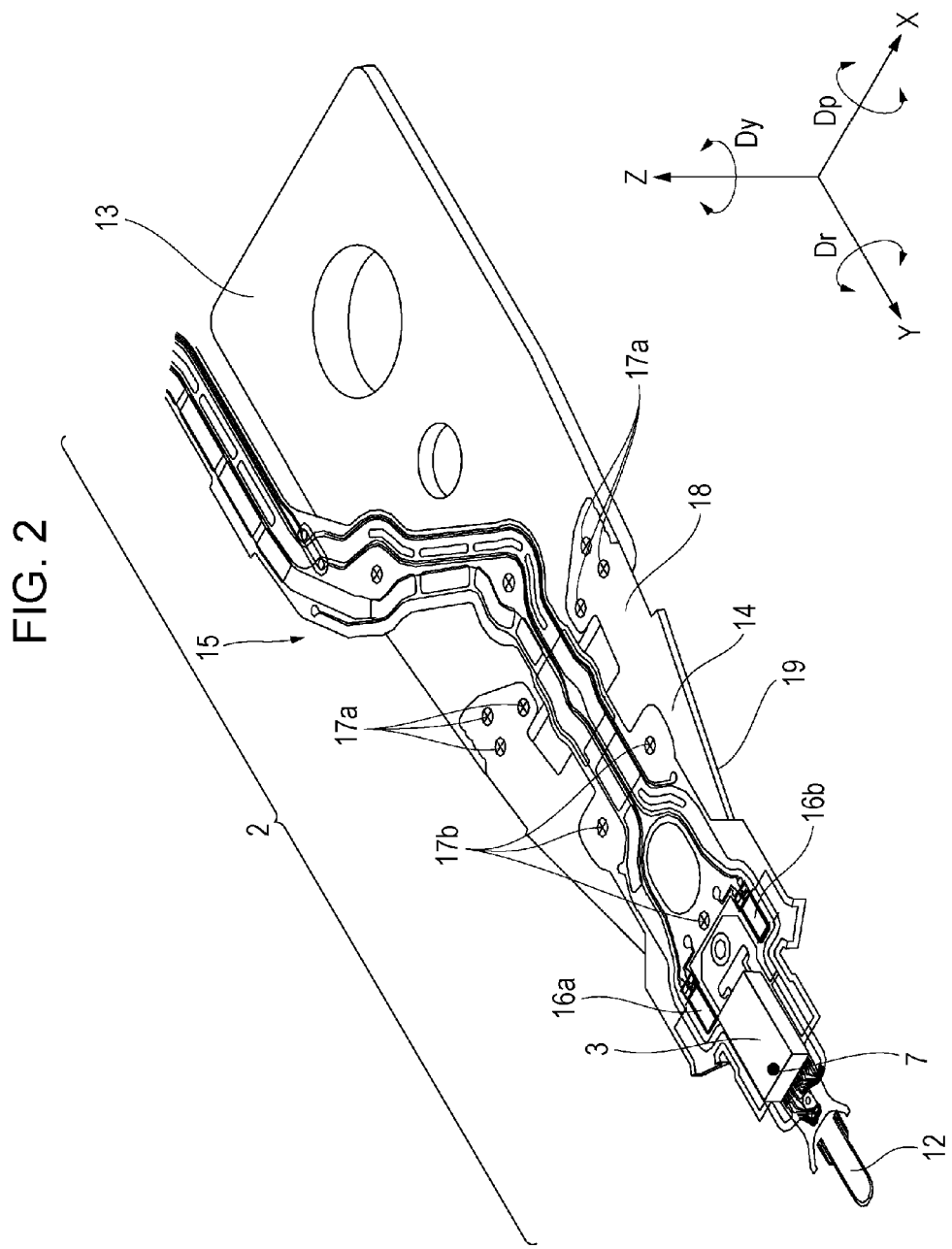
FIG. 2 is a perspective view of the head assembly according to the preferred embodiment of the present invention.

FIG. 2 is a perspective view schematically illustrating the entire configuration of the head assembly 2 according to the preferred embodiment of the present invention. Hereinafter, for the sake of convenience of description, positive Z-axis direction in FIG. 2 is referred to as the upper surface side of the head assembly 2, and negative Z-axis direction is referred to as the rear surface side or the lower surface side of the head assembly 2. The slider 3 is provided with the head element 7 at the rear end (trailing edge, positive Y-axis direction in FIG. 2) face of the slider 3, the head element 7 including an inductive write head element and an MR read thin film magnetic head such as a giant magneto-resistance (GMR) read head element or a tunnel magneto-resistive effect (TMR) read head element.

As seen from FIG. 2, the head assembly 2 includes, as its main components, a base plate 13, a load beam 14, a flexure 15, a first thin film piezoelectric element which is a first drive unit 16a, a second thin film piezoelectric element which is a second drive unit 16b, and the slider 3. Also, the base plate 13 is mounted on the tip end of the support arm 8.

As seen from FIG. 2, the load beam 14 is fixed to the base plate 13 via a plurality of beam welding points 17a. Also, a leaf spring 18 is formed in the load beam 14 so as to cause the slider 3 to generate a predetermined pressing force. In addition, the load beam 14 has undergone processing to have bent parts 19 on both sides to achieve a structure having increased strength. The flexure 15 is fixed to the load beam 14 via beam welding points 17b. In FIG. 2, the pitch direction, the roll direction, and the yaw direction of the attitude angle of the slider 3 are denoted by Dp, Dr, and Dy, respectively.

Figure 3:
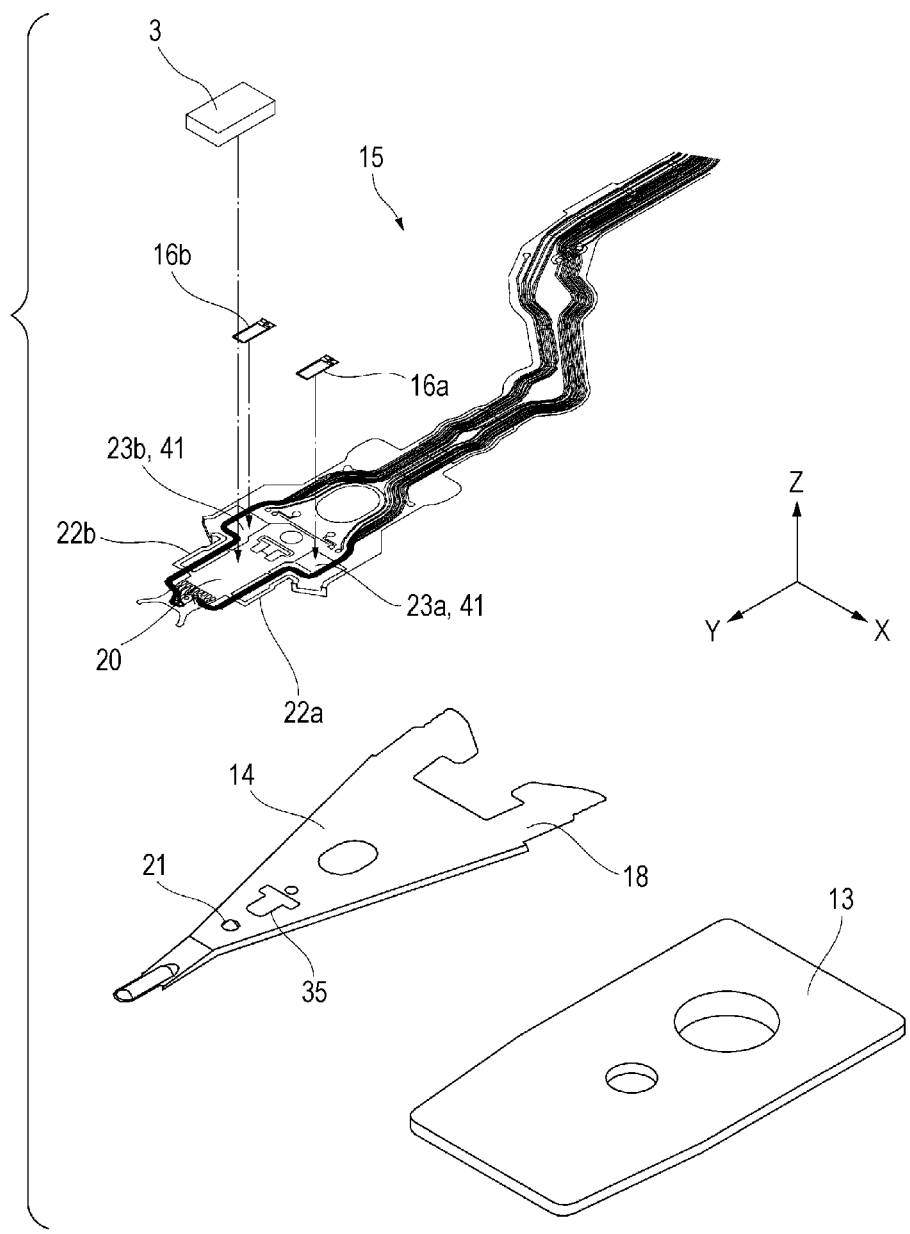
FIG. 3 is an exploded perspective view of the head assembly according to the preferred embodiment of the present invention.

FIG. 3 is an exploded perspective view schematically illustrating the head assembly 2 according to the preferred embodiment of the present invention. That is, FIG. 3 illustrates the manner in which the head assembly 2 is exploded into the load beam 14, the flexure 15, the base plate 13, the drive units 16a and 16b, and the slider 3.

As seen from FIG. 3, the slider 3 is bonded and fixed on a slider support plate 20 formed in the flexure 15. A support projection 21 is formed integrally with the load beam 14 on the center line of the vicinity of the tip end of the load beam 14, thereby forming a pivot structure in which the support projection 21 is in point contact with the slider support plate 20 which is supported by a first outrigger 22a and a second outrigger 22b. This structure allows the slider 3 to smoothly maintain a floating posture according to the curvature of the disk surface.

The first drive unit 16a and the second drive unit 16b are each a thin film piezoelectric element, and are bonded onto a first piezoelectric body supporter 23a and a second piezoelectric body supporter 23b. It is to be noted that the first piezoelectric body supporter 23a and the second piezoelectric body supporter 23b are formed of only insulating layers which are included in the flexure 15.

Figure 4:
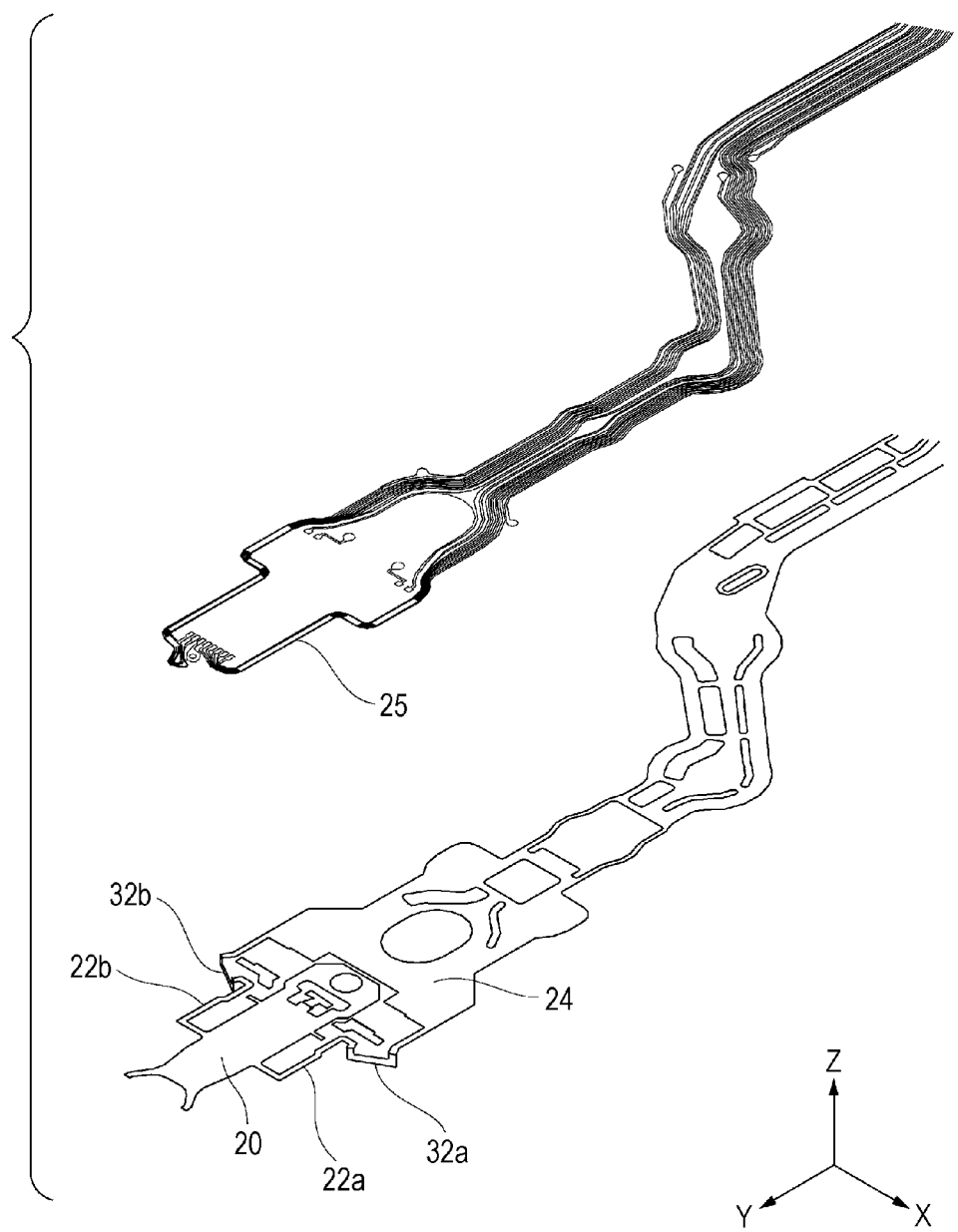
FIG. 4 is an exploded perspective view of a flexure provided in the head assembly according to the preferred embodiment of the present invention.

FIG. 4 is an exploded perspective view illustrating the configuration of the flexure 15 provided in the head assembly according to the preferred embodiment of the present invention. The flexure 15 is typically a wiring substrate that is manufactured by using a material including a thin stainless steel plate with a thickness of approximately 20 μm, an insulating layer coated on the stainless steel plate, and a copper foil plated on the insulating layer. A precise wiring pattern in any shape may be formed in the flexure 15 by etching process. Although the flexure is originally integrally formed, in FIG. 4, a flexure substrate 24 made of stainless steel and a head element wiring 25 (wiring section) are separately displayed facilitate the understanding of the structure.

Figure 5A:
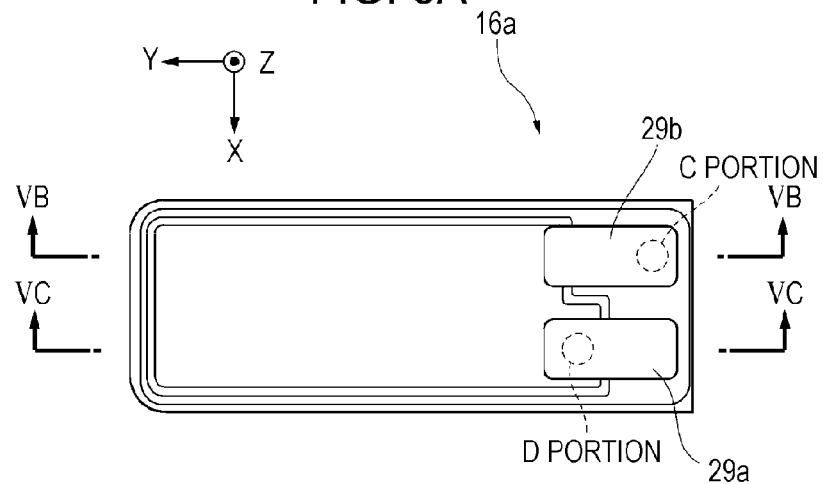
FIG. 5A is a plan view of a first drive unit provided in the head assembly according to the preferred embodiment of the present invention.
Figure 5B:
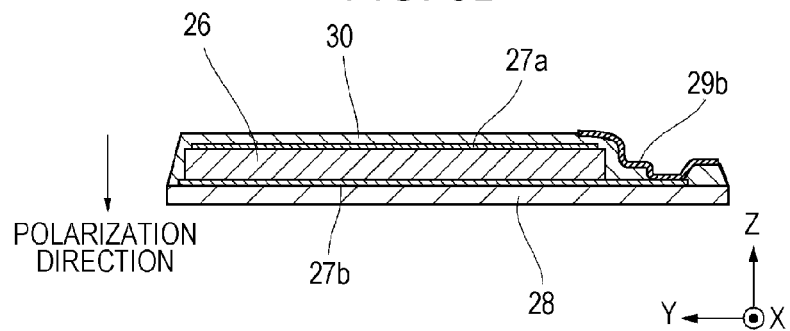
FIG. 5B is a cross-sectional view taken along VB-VB in FIG. 5A.
Figure 5C:
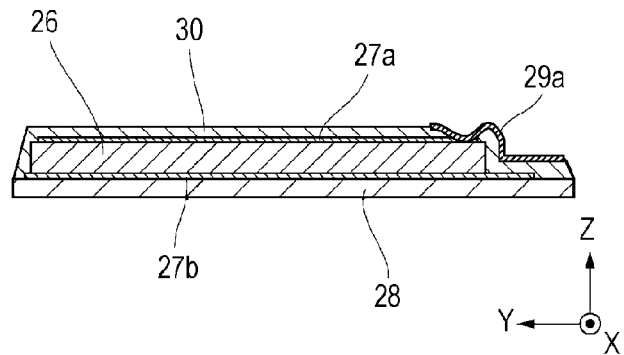
FIG. 5C is a cross-sectional view taken along VC-VC in FIG. 5A.

FIG. 5A is a plan view of the first drive unit 16a provided in the head assembly according to the preferred embodiment of the present invention. FIG. 5B is a cross-sectional view taken along VB-VB in FIG. 5A and FIG. 5C is a cross-sectional view taken along VC-VC in FIG. 5A. An upper electrode 27a is formed on the upper surface of a thin film piezoelectric body 26, and a lower electrode 27b is formed beneath the lower surface of the thin film piezoelectric body 26. Because the first drive unit 16a and the second drive unit 16b are very thin and easily damaged, a base 28 is provided as a reinforcing member.

In order to protect the thin film piezoelectric body 26, the entire first drive unit 16a and second drive unit 16b are covered with an insulating cover 30 made of polyimide. It is to be noted that the insulating cover 30 is partially removed in C portion and D portion in FIG. 5A. In the C portion, the lower electrode 27b is exposed and electrically connected to a second electrode pad 29b. In the D portion, the upper electrode 27a is exposed and electrically connected to a first electrode pad 29a. Thus, application of a voltage to the first electrode pad 29a (third electrode pad 29c), the second electrode pad 29b (fourth electrode pad 29d) causes the thin film piezoelectric body 26 of the first drive unit 16a (the second drive unit 16b) to expand and contract. The polarization direction of the thin film piezoelectric body 26 is indicated by an arrow. When a negative voltage is applied to the second electrode pad 29b and a positive voltage is applied to the first electrode pad 29a, the thin film piezoelectric body 26 contracts in a direction inward from the surface of the piezoelectric film due to a piezoelectric constant d31.

Figure 6:
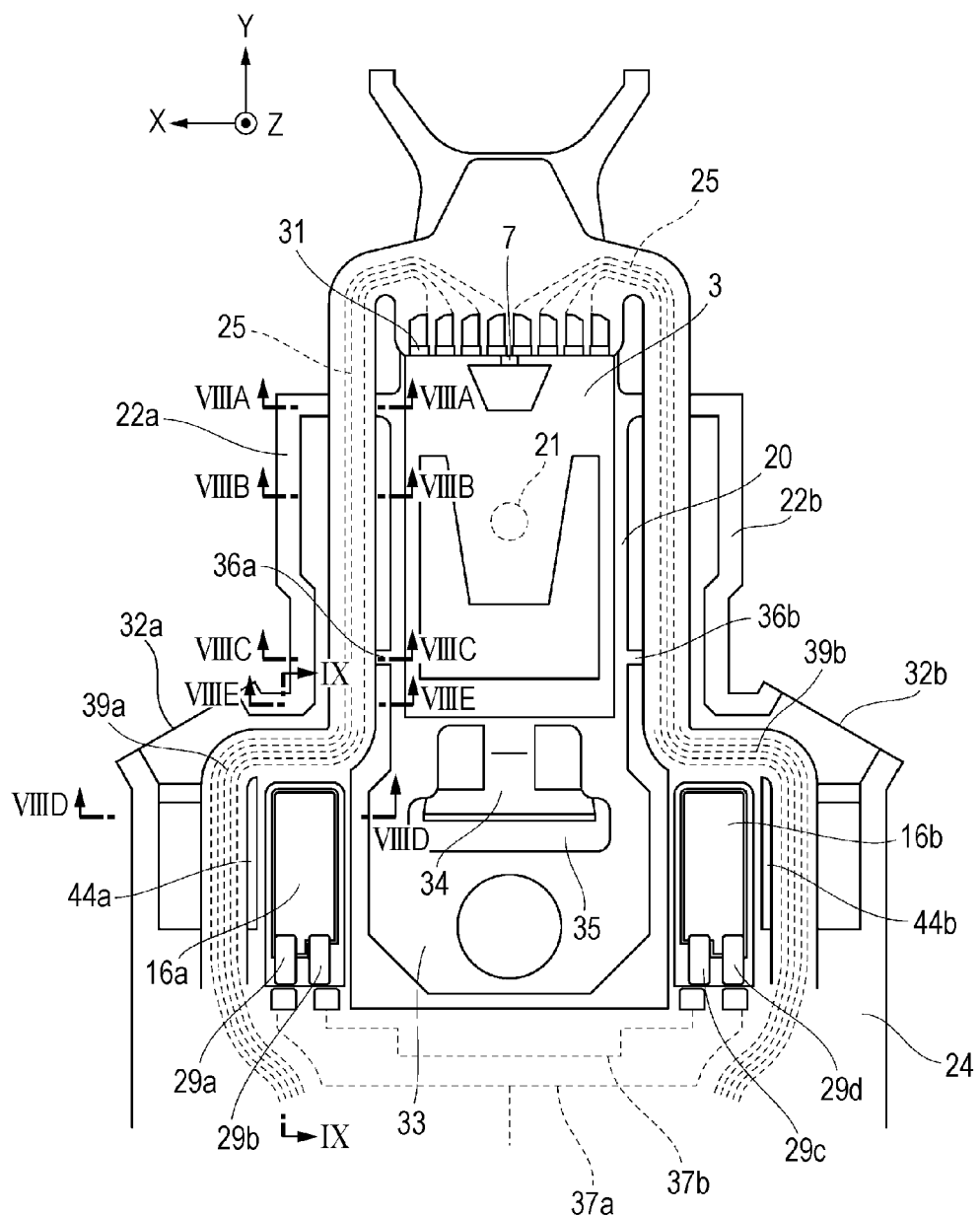
FIG. 6 is a plan view from the upper surface side of the main tip end of the head assembly according to the preferred embodiment of the present invention.
Figure 7:
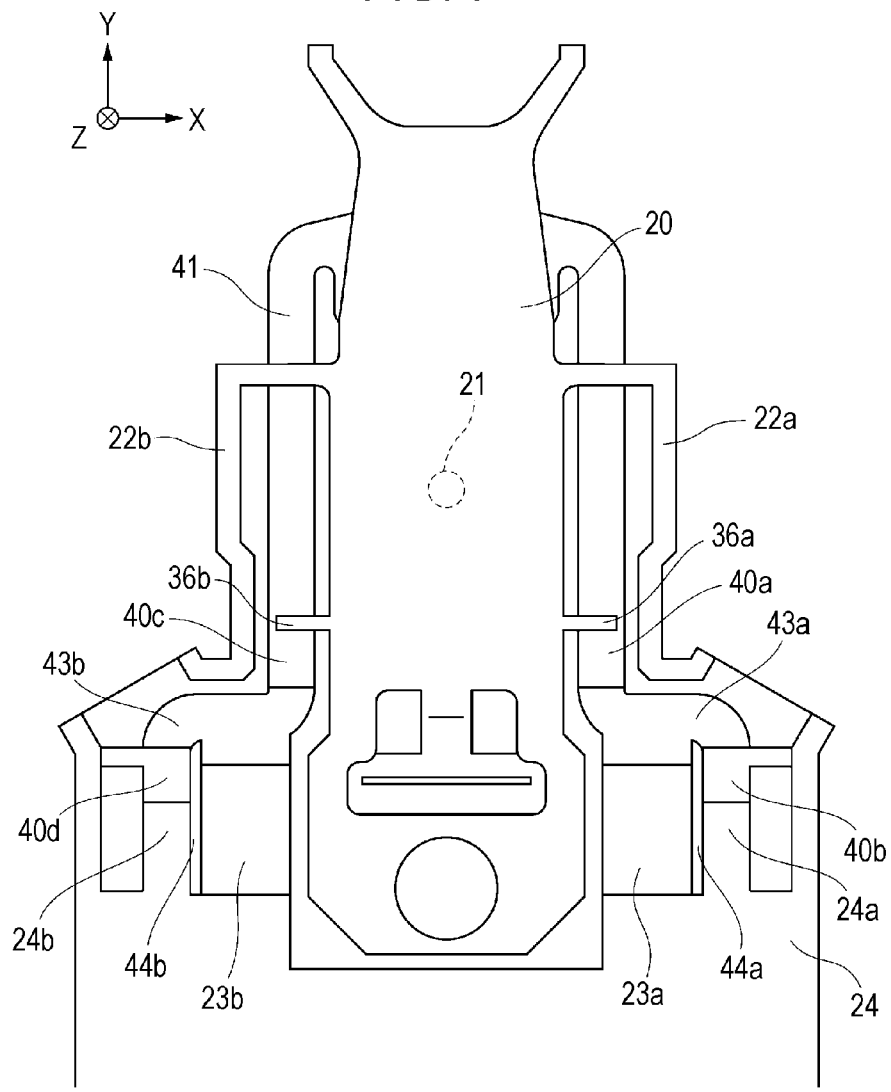
FIG. 7 is a plan view from the lower surface side of the main tip end of the head assembly according to the preferred embodiment of the present invention.

FIG. 6 is a plan view from the upper surface side (the slider 3 side) of the main tip end of the head assembly according to the preferred embodiment of the present invention. FIG. 7 is a plan view (a plan view of the head assembly 2 of FIG. 6 seen from the rear surface side) from the lower surface side of the main tip end of the head assembly according to the preferred embodiment of the present invention. It is to be noted that the load beam 14 is excluded from FIGS. 6 and 7. The slider 3 is bonded onto the slider support plate 20, and the head element wiring 25 (wiring section) corresponding to a head electrode terminal 31 is installed and connected by a solder ball.

In FIG. 6, in the first and second outriggers 22a, 22b disposed on both sides of the slider support plate 20, a first bent part 32a and a second bent part 32b are partially formed. In addition, the support projection 21 is designed to coincide with the intersection point of lines extended from the first and second bent parts 32a, 32b on the right and left. Also, the slider support plate 20 is designed to be rotated around the support projection 21 due to the operation of the first bent part 32a, the second bent part 32b that are each provided at an intermediate position of the first and second outriggers 22a, 22b, respectively.

The slider support plate 20 has a counterbalance 33 that is set so that the support projection 21 is aligned with an axis of inertia in a yaw direction of the rotatable part including the slider 3. In addition, the slider support plate 20 has a T type limiter 34 which is engaged with a hole 35 formed in the load beam 14 and which lifts the slider 3 up when the slider 3 is unloaded from the disk. At the time of normal operation, the T type limiter 34 and the hole 35 are not in contact with each other with a gap therebetween.

The head element wiring 25 (wiring section) is disposed so as to surround the slider 3 and the end of the head element wiring 25 is connected to the head electrode terminal 31 of the slider 3. The head element wiring 25 (wiring section) is fixed to the first and second outriggers 22a, 22b (VIIIA-VIIIA portion of FIG. 6) as well as a first drive rib 36a and a second drive rib 36b that extend from the slider support plate 20 (VIIIC-VIIIC portion of FIG. 6) in the same manner.

The first drive unit 16a and the second drive unit 16b are driven by applying a voltage to first, second, third, fourth electrode pads 29a, 29b, 29c, 29d. The driver wire 37a is disposed to apply an input to the first electrode pad 29a of the first drive unit 16a and the fourth electrode pad 29d of the second drive unit 16b. A grand wiring 37b connects the second electrode pad 29b of the first drive unit 16a and the third electrode pad 29c of the second drive unit 16b. When an alternating drive signal is inputted to the driver wire 37a, the first drive unit 16a and the second drive unit 16b produce expansion and contraction motion in mutually opposite directions.

Figure 8A:
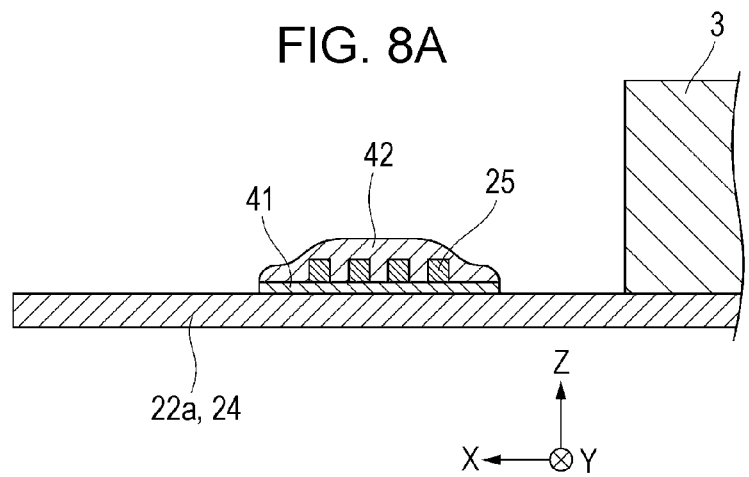
FIG. 8A is a cross-sectional view taken along VIIIA-VIIIA in FIG. 6.
Figure 8B:
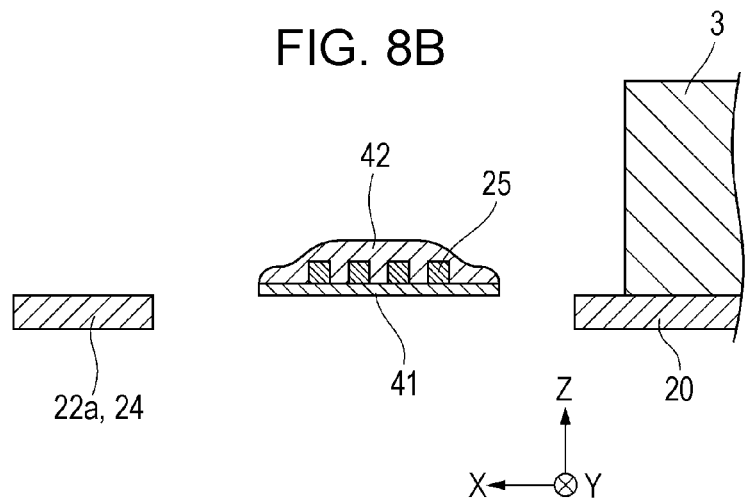
FIG. 8B is a cross-sectional view taken along VIIIB-VIIIB in FIG. 6.
Figure 8C:
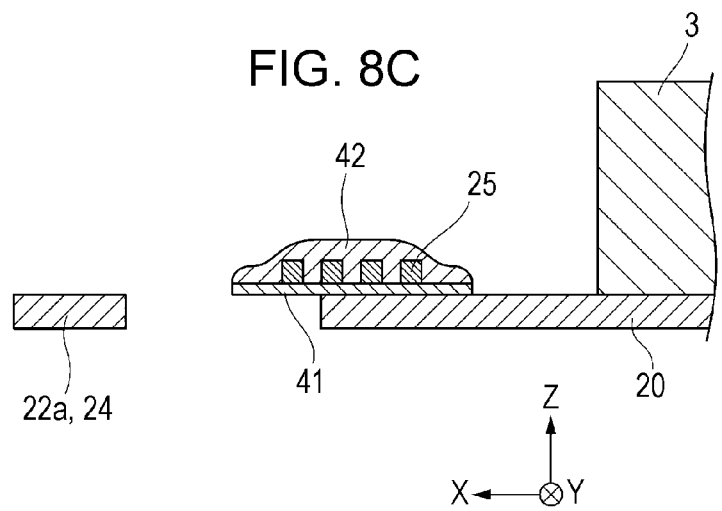
FIG. 8C is a cross-sectional view taken along VIIIC-VIIIC in FIG. 6.
Figure 8D:
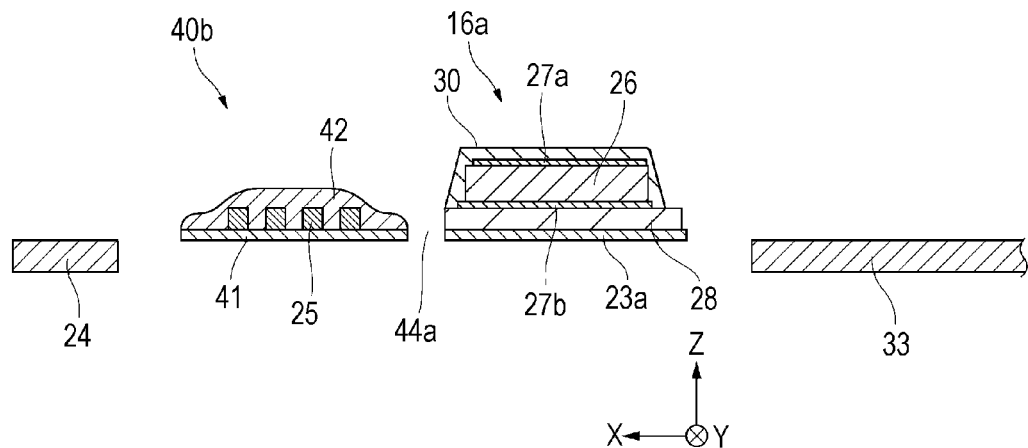
FIG. 8D is a cross-sectional view taken along VIIID-VIIID in FIG. 6.
Figure 8E:
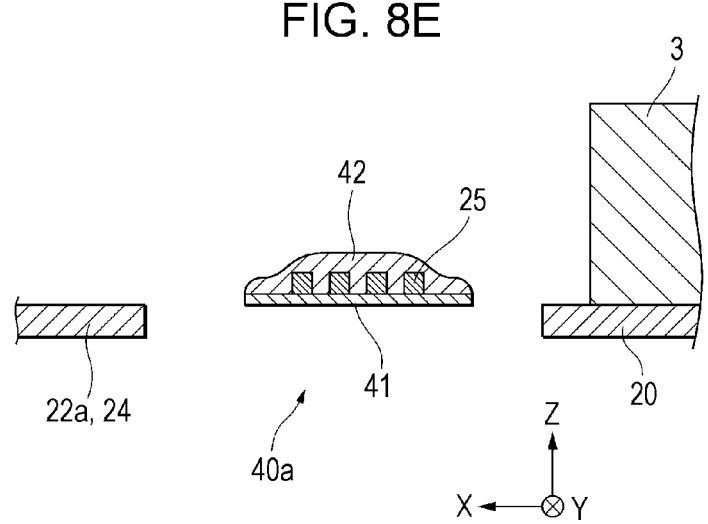
FIG. 8E is a cross-sectional view taken along VIIIE-VIIIE in FIG. 6.

The flexure 15 includes stainless material having a thickness of 18 μm, an insulating layer 41 such as polyimide formed on the stainless material, and the head element wiring 25 (wiring section) formed on the insulating layer 41. Furthermore, for the purpose of insulating and protecting the wiring, the head element wiring 25 is covered with a wiring cover layer 42 such as polyimide. The flexure 15 achieves a desired mechanical function by etching the stainless-steel flexure substrate 24 to form any shape. The flexure structure depicted in FIG. 6 (FIG. 7) is illustrated with reference to FIGS. 8A to 8E each for a cross-sectional view. FIG. 8A is a cross-sectional view taken along VIIIA-VIIIA in FIG. 6, FIG. 8B is a cross-sectional view taken along VIIIB-VIIIB in FIG. 6, FIG. 8C is a cross-sectional view taken along VIIIC-VIIIC in FIG. 6, FIG. 8D is a cross-sectional view taken along VIIID-VIIID in FIG. 6, and FIG. 8E is a cross-sectional view taken along VIIIE-VIIIE in FIG. 6. The VIIIB-VIIIB cross section and the VIIIE-VIIIE cross section are the same cross-sectional shape and the stainless steel beneath the head element wiring 25 (wiring section) has been removed by etching.

Figure 9:
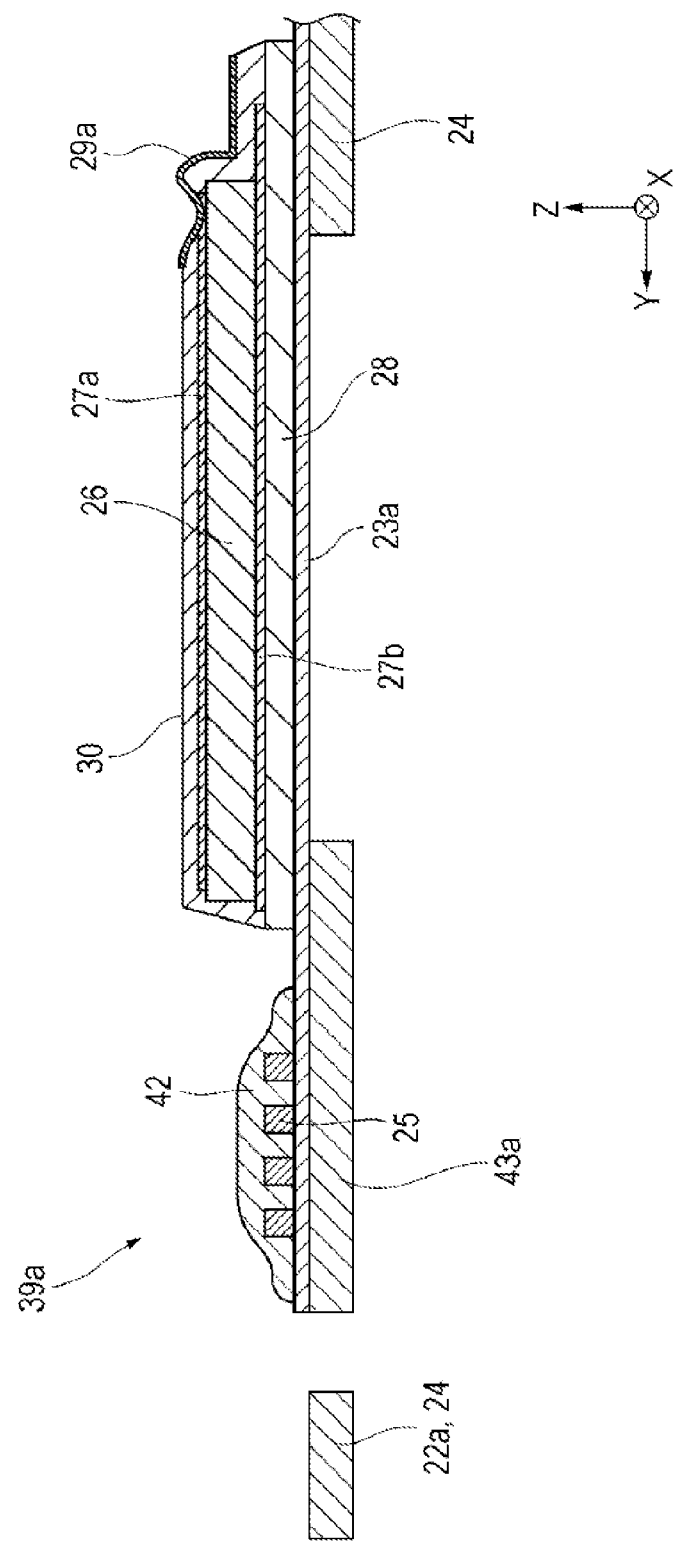
FIG. 9 is a cross-sectional view of a portion where the first drive unit is bonded to the flexure in the head assembly according to the preferred embodiment of the present invention.

FIG. 9 is a cross-sectional view (IX-IX cross section in FIG. 6) of a portion where the first drive unit 16a is bonded to the flexure 15 in the head assembly 2 according to the preferred embodiment of the present invention. The first drive unit 16a is bonded onto the first piezoelectric body supporter 23a at a position where the end of the first drive unit 16a is overlapped with a reinforcing plate 43a of a first link 39a in which the reinforcing plate 43a is formed by leaving part of the flexure substrate 24. Similarly, the second drive unit 16b is bonded onto the second piezoelectric body supporter 23b at a position where the end of the second drive unit 16b is overlapped with a reinforcing plate 43b of a second link 39b in which the reinforcing plate 43b is formed by leaving part of the flexure substrate 24. This is for the purpose of reliably transmitting a displacement of the thin film piezoelectric body 26 to the first link 39a (the second link 39b). As illustrated in FIG. 9, the first link 39a includes the head element wiring 25 that transmits a signal to the head element 7, and the reinforcing plate 43a that partially reinforces the head element wiring 25.

The first link 39a is installed to interconnect between a first joint 40a and a second joint 40b. The first joint 40a is connected to the first drive rib 36a, and the second joint 40b is connected to a first fixing portion 24a that is part of the flexure 15 (FIG. 7). Similarly, the second link 39b is installed to interconnect between a third joint 40c and a fourth joint 40d, the third joint 40c is connected to the second drive rib 36b, and the fourth joint 40d is supported by a second fixing portion 24b that is part of the flexure 15 (FIG. 7). The third and fourth joints 40c, 40d and the first and second joints 40a, 40b have the same structure. As illustrated in FIG. 8E, the first joint 40a is formed by part of the head element wiring 25 (wiring section) in which the flexure substrate 24 of the flexure 15 has been removed by etching. Similarly, as illustrated in FIG. 8D, the second joint 40b is formed by part of the head element wiring 25 (wiring section) in which the flexure substrate 24 of the flexure 15 has been removed by etching. Because the first and second joints 40a, 40b are made more flexible compared with the first link 39a, expansion and contraction motion of the first drive unit 16a causes the first link 39a to finely rotate around the second joint 40b. Similarly, expansion and contraction motion of the second drive unit 16b causes the second link 39b to finely rotate around the fourth joint 40d.

It is to be noted that the base plate 13 and the load beam 14 of the head assembly 2 are each symmetrical with respect to a central axis which is parallel to the direction of the Y-axis in each Figure. Similarly, the first link 39a and second link 39b, the first joint 40a, second joint 40b, third joint 40c, and fourth joint 40d, and the first drive unit 16a and the second drive unit 16b each have a symmetrical structure with respect to a central axis which is parallel to the direction of the Y-axis in each Figure.

In FIGS. 6 and 7, a first separation groove 44a is provided to separate the first drive unit 16a from the second joint 40b and the flexure substrate 24. The first separation groove 44a is formed in a range corresponding to the length of the thin film piezoelectric body 26 in the longitudinal direction (the X-axis direction). The first separation groove 44a enables the displacement of the thin film piezoelectric body 26 to be maximized by releasing the restriction due to the second joint 40b including the head element wiring 25 (wiring section), and the flexure substrate 24. It is to be noted that this is also the case with a second separation groove 44b as seen from FIG. 6 because the head assembly 2 has a symmetrical shape with respect to a symmetrical axis parallel to the Y-axis.

Figure 10:
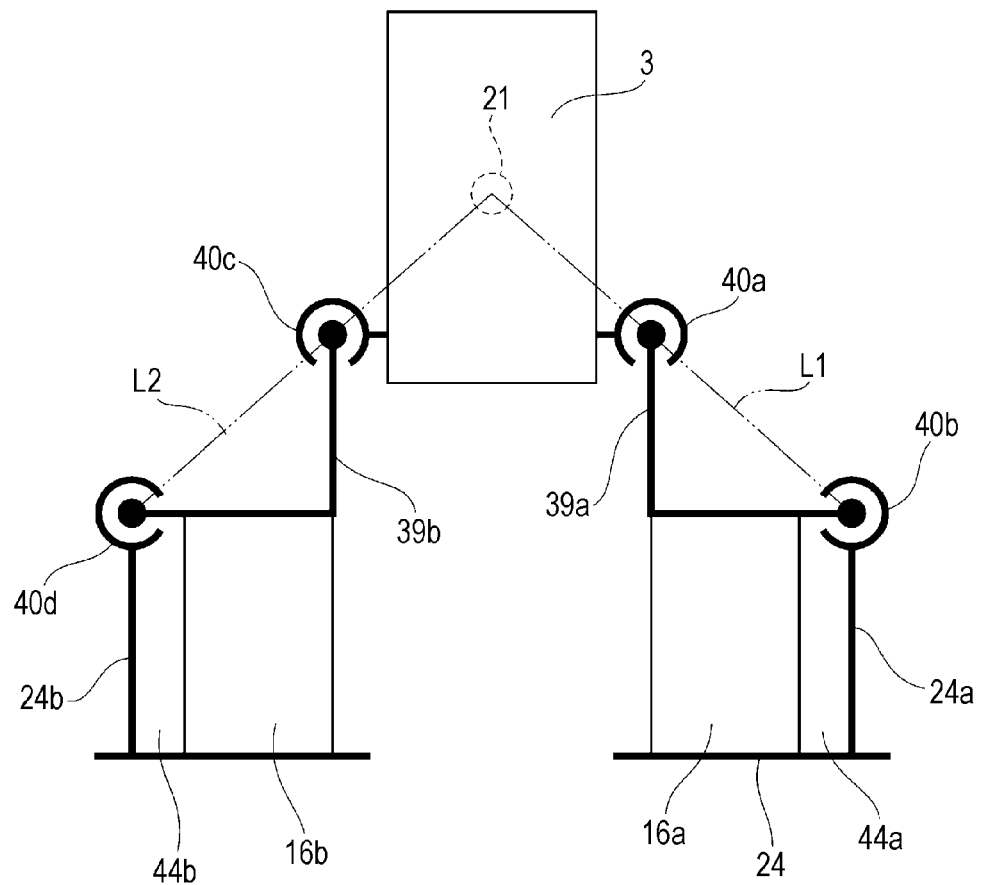
FIG. 10 is a model diagram of a rotation mechanism of a slider in the head assembly according to the preferred embodiment of the present invention.

FIG. 10 is a simplified model diagram of a mechanism that causes the slider 3 to produce rotational motion around the support projection 21 due to the first and second drive units 16a, 16b in FIG. 6. The first drive unit 16a has one end fixed to the L-shaped first link 39a and the other end fixed to the flexure substrate 24. The first joint 40a and the second joint 40b are formed at both ends of the first link 39a.

The first joint 40a is in an area surrounded by the first drive rib 36a and the first link 39a in FIG. 7. Similarly, the second joint 40b corresponds to an area surrounded by the first link 39a and the flexure substrate 24 in FIG. 7. Similarly, the third joint 40c corresponds to an area surrounded by the second link 39b and the second drive rib 36b, and the fourth joint 40d corresponds to an area surrounded by the second link 39b and the flexure substrate 24. The first to fourth joints 40a to 40d bend relatively flexibly because the flexure substrate 24 has been removed by etching.

In FIG. 10, it is preferable that a first line segment L1 and a second line segment L2 intersect at the support projection 21 of the load beam 14, the first line segment L1 connecting the first joint 40a and the second joint 40b, the second line segment L2 connecting the third joint 40c and the fourth joint 40d. This is because the first line segment L1 rotates around the joint 40b and the second line segment L2 rotates around the joint 40d, and in the mechanism including the first line segment L1, the second line segment L2, and the slider 3, an instantaneous center in the rotational motion of the slider is located on the support projection 21. That is, when the instantaneous center is located on the support projection 21, a load against the rotational motion reduces and thus a larger rotational displacement may be obtained.

FIG. 11 is a simplified model diagram of the manner in which the slider 3 produces a rotational motion around the support projection 21 due to the first and second drive units 16a, 16b in FIG. 10. The operation of the rotational mechanism configured in the above-described manner will be described with reference to FIG. 11. First, a voltage is applied to the second drive unit 16b, that is, an electric field is applied in a polarization direction, and thus the second drive unit 16b contracts. On the other hand, the first drive unit 16a expands because the same voltage is applied to the first drive unit 16a in the opposite direction to the direction for the second drive unit 16b. A deformed shape of a single drive unit is illustrated by a dashed line. Consequently, the first link 39a rotates around the second joint 40b in a clockwise direction, and the second link 39b rotates around the fourth joint 40d in the same direction. Because the support projection 21, the first joint 40a, and the second joint 40b are initially arranged on a straight line, the first joint 40a rotates around the support projection 21. Similarly, the third joint 40c rotates around the support projection 21 because the support projection 21, the third joint 40c, and the fourth joint 40d are initially arranged on a straight line. However, the slider 3 rotates around the support projection 21 in a counterclockwise direction.

Example

Figure 12:
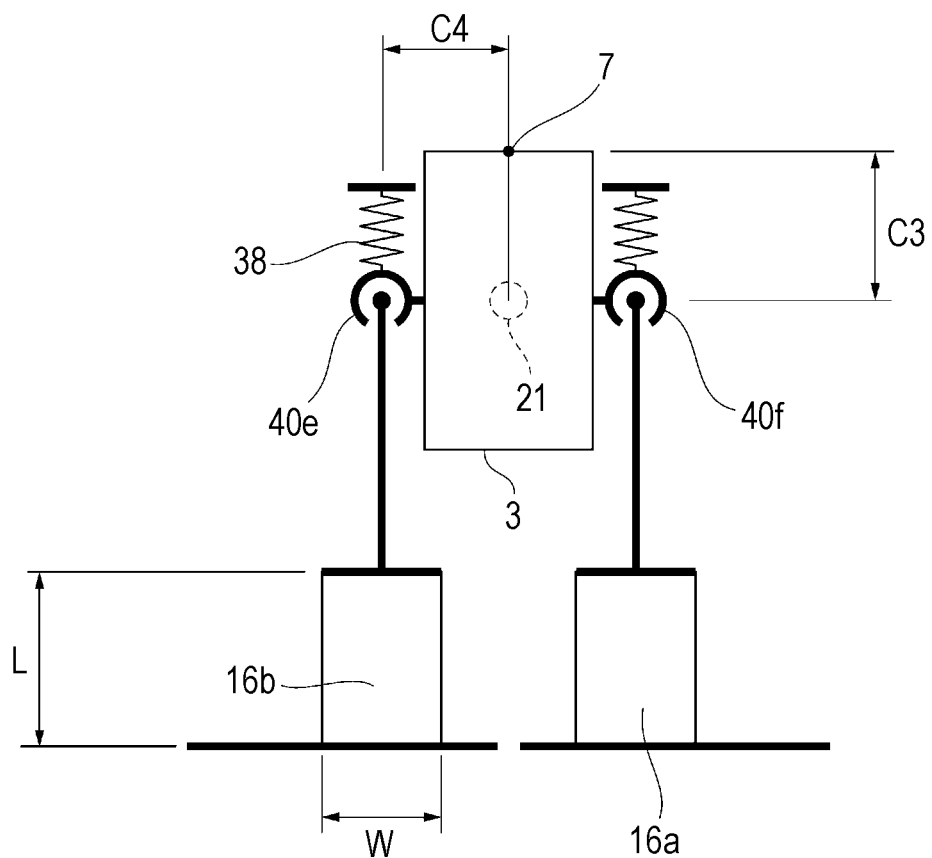
FIG. 12 is a model diagram of a rotation mechanism of a slider in a conventional example.

Hereinafter, increase in the displacement of the head in the present embodiment will be specifically illustrated by an example and a conventional example. FIG. 12 is a simplified model diagram of the head assembly 2 in a conventional configuration (conventional example).

Calculation of a head displacement x is expressed with reference to FIG. 12. Expression 1 is a calculation expression for a head displacement x1 [nm/V] in the conventional example, where d31 is a piezoelectric constant, V is an applied voltage, L is the length of the piezoelectric body, E is a longitudinal elastic modulus of the piezoelectric body, W is the width of the piezoelectric body, K is a mechanism load 38 of the upper electrode 27a, the lower electrode 27b, the first and second bent parts 32a, 32b, and each joint, t is the thickness of the piezoelectric body, C3 is the distance between the support projection 21 and the head element 7, and C4 is the distance between a conventional joint 40e and the support projection 21. For example, Expression 1 gives head element displacement x1 of 9.15 nm in a conventional model under the condition that effective displacement length L of the thin film piezoelectric element=90 μm and effective displacement width W thereof=360 μm.

$$x = \frac{d_{31} \cdot V \cdot L \cdot E \cdot W}{K \cdot L \cdot \left(1 + \frac{d_{31} \cdot V}{t}\right) + E \cdot t \cdot W} \cdot \frac{c_3}{c_4}$$

FIG. 13 is a simplified model diagram of the configuration of the head assembly 2 in the example based on the configuration of the embodiment. In the example, the thin film piezoelectric elements 16a, 16b (the first and second drive units 16a, 16b) having the same size as in the conventional example were used. Calculation of a head displacement x2 is expressed with reference to FIG. 13. Expression 2 is a calculation expression for a head displacement x2 [m/V] in the example, where a is the distance between the fourth joint 40d and an end side of the second drive unit 16b away from the slider 3 in the X direction, C1 is the distance between the third joint 40c and the fourth joint 40d, C2 is the distance between the third joint 40c and the support projection 21, C3 is the distance between the support projection 21 and the head element 7, and C4 is the distance between the head element 7 and the third joint 40c in the X direction. Calculation using Expression 2 gives a head element displacement x2 of 17.3 nm in the example.

$$x = \frac{c_1 \cdot c_3}{2 \cdot c_2} \cdot \frac{E \cdot d_{31} \cdot V \cdot L[(a+W)^2 - a^2]}{L \cdot \left(1 + \frac{d_{31} \cdot V}{t}\right) \cdot K \cdot (c_1 \cdot \cos\alpha)^2 + \frac{1}{3}[(a+W)^3 - a^3]}$$

The comparison between the results obtained in the conventional example and the example is as follows: the head displacement x2=17.3 nm in the example, whereas the head displacement x1=9.15 nm in the conventional example. Thus, it is verified that the head displacement x in the example has been improved by approximately a factor of 2 compared with the conventional example.

Figure 14:
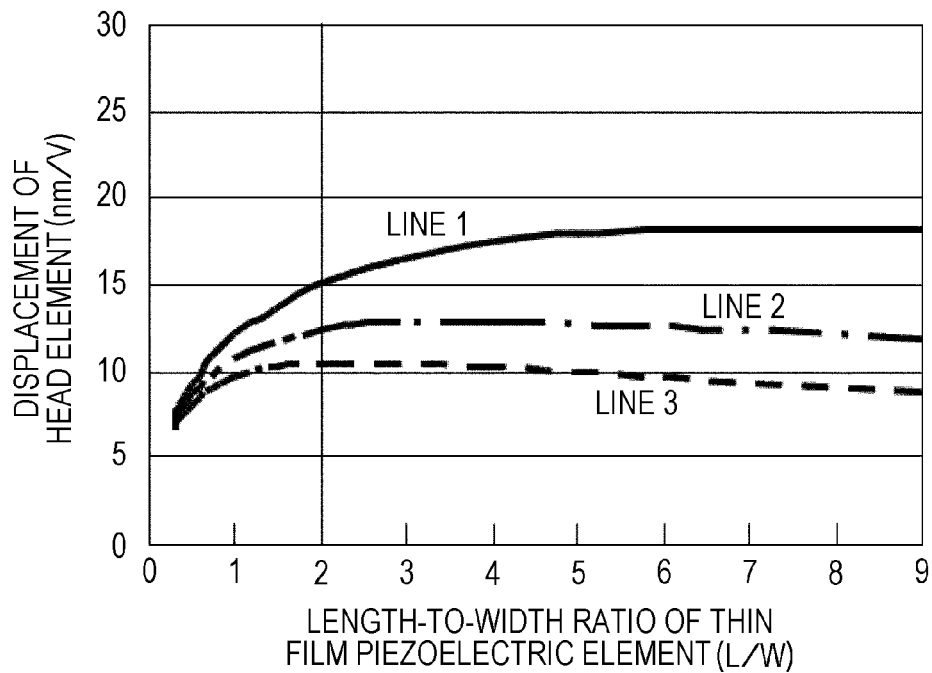
FIG. 14 is a diagram illustrating the relationship between length-to-width ratio of thin film piezoelectric element and displacement of head in the example.

FIG. 14 illustrates a result of calculation of the head displacement when length-to-width ratio L/W is changed under the condition that the area (=L×W) of effective displacement part of the thin film piezoelectric element (the first and second drive units 16a, 16b) is constant in the model of FIG. 13, where the horizontal axis indicates the ratio of the length L to the width W of the thin film piezoelectric element (the first and second drive units 16a, 16b). It is to be noted that line 1 indicates a result in the case of the mechanism load 38 having a reference value, line 2 indicates a result in the case of the mechanism load 38 having twice the reference value, and line 3 indicates a result in the case of the mechanism load 38 having three times the reference value. Naturally, the displacement decreases as the mechanism load 38 increases. Although the head displacement x initially improves when the length-to-width ratio L/W is increased, the degree of improvement gradually reduces. This is because when the length-to-width ratio L/W is increased with a constant area, the width dimension decreases accordingly and the thin film piezoelectric element is unable to resist a drive load, and so there is a limit in increasing the length-to-width ratio L/W. It is to be noted that the head displacement x is a travel distance of the head element 7 when the slider 3 is rotated around the support projection 21 due to the thin film piezoelectric element (the first and second drive units 16a, 16b). Greater head displacement x indicates better performance.

Figure 15:
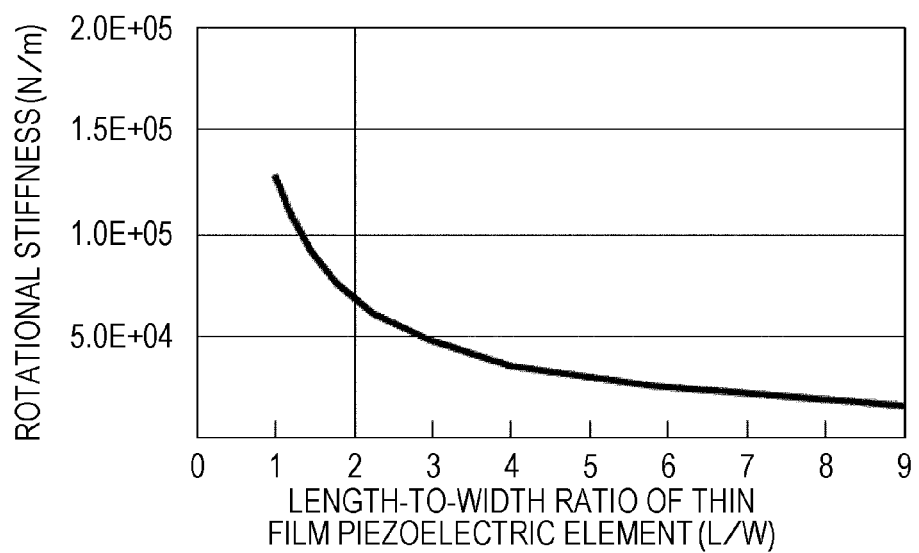
FIG. 15 is a diagram illustrating the relationship between length-to-width ratio of thin film piezoelectric element and rotational stiffness of slider in the example.

FIG. 15 is a diagram illustrating the rotational stiffness of the slider 3 where the horizontal axis indicates the length-to-width ratio L/W of the thin film piezoelectric element (the first and second drive units 16a, 16b). The rotational stiffness of the slider 3 decreases as the length-to-width ratio L/W is increased. That is, when the length-to-width ratio L/W is 2 or greater in FIG. 14, the degree of improvement in displacement gradually reduces. Also, when the length-to-width ratio L/W is 2 or greater in FIG. 15, reduction in the rotational stiffness of the slider 3 is slow. It may be concluded that the characteristic of the displacement in FIG. 14 and the characteristic of the rotational stiffness in FIG. 15 have a trade-off relationship. Thus, it is desirable that the length-to-width ratio L/W of the thin film piezoelectric element (the first and second drive units 16a, 16b) be 2 or greater in which the head displacement is stable and the rotational stiffness of the slider 3 is not relatively low. When the length-to-width ratio L/W is 5 or greater, the effect of improvement in the head displacement is not achieved and the rotational stiffness of the slider 3 decreases. Therefore, the length-to-width ratio L/W is preferably 5 or less.

As described above, according to a the present embodiment, the head assembly 2 is implemented that is capable of obtaining an efficient, desired head element displacement and achieving efficient drive without increasing the size of the thin film piezoelectric element (the first and second drive units 16a, 16b). In contrast to the wiring structure described in JP-A No. 2011-138596, the thin film piezoelectric element is not surrounded by the wiring, and so when the thin film piezoelectric element (the first and second drive units 16a, 16b) is deformed, the wiring does not simply expand and contact and the displacement of the thin film piezoelectric element is not restrained, but a link structure is formed by utilizing the wiring section, thereby achieving a configuration in which the displacement is efficiently amplified. Consequently, a predetermined displacement may be ensured with a smaller thin film piezoelectric element and reduction in the cost of the assembly may be achieved.

What is claimed is:

1. A head assembly in which a slider including a head element is supported on a slider support plate which is formed in a flexure and rotatable around a support projection which is provided at a tip end of a load beam,
the head assembly comprising:
a first link that is disposed to interconnect between a first joint connected to the slider support plate and a second joint connected to a first fixing portion;
a second link that is disposed to interconnect between a third joint connected to the slider support plate and a fourth joint connected to a second fixing portion;
a first drive unit that drives the first link; and
a second drive unit that drives the second link.

2. The head assembly according to claim 1,
wherein the support projection coincides with an intersection point of lines extended from a first line segment and a second line segment, the first line segment connecting the first joint and the second joint, the second line segment connecting the third joint and the fourth joint.

3. The head assembly according to claim 1,
wherein the first and second links each include a wiring section that transmits a signal to the head element, and a reinforcing plate that partially reinforces the wiring section.

4. The head assembly according to claim 1,
wherein a first separation groove is provided between the first drive unit and the second joint, and a second separation groove is provided between the second drive unit and the fourth joint.

5. The head assembly according to claim 1,
wherein a length-to-width ratio L/W of an area of each of the first and second drive units is 2 or greater.

6. The head assembly according to claim 2,
wherein the first and second links each include a wiring section that transmits a signal to the head element, and a reinforcing plate that partially reinforces the wiring section.

7. The head assembly according to claim 2,
wherein a first separation groove is provided between the first drive unit and the second joint, and a second separation groove is provided between the second drive unit and the fourth joint.

8. The head assembly according to claim 3,
wherein a first separation groove is provided between the first drive unit and the second joint, and a second separation groove is provided between the second drive unit and the fourth joint.

9. The head assembly according to claim 6,
wherein a first separation groove is provided between the first drive unit and the second joint, and a second separation groove is provided between the second drive unit and the fourth joint.

10. The head assembly according to claim 2,
wherein a length-to-width ratio L/W of an area of each of the first and second drive units is 2 or greater.

11. The head assembly according to claim 3, wherein a length-to-width ratio L/W of an area of each of the first and second drive units is 2 or greater.

12. The head assembly according to claim 4, wherein a length-to-width ratio L/W of an area of each of the first and second drive units is 2 or greater.

13. The head assembly according to claim 6, wherein a length-to-width ratio L/W of an area of each of the first and second drive units is 2 or greater.

14. The head assembly according to claim 7, wherein a length-to-width ratio L/W of an area of each of the first and second drive units is 2 or greater.

15. The head assembly according to claim 8, wherein a length-to-width ratio L/W of an area of each of the first and second drive units is 2 or greater.

16. The head assembly according to claim 9, wherein a length-to-width ratio L/W of an area of each of the first and second drive units is 2 or greater.

\* \* \* \* \*